Nov. 19, 1968 J. A. HOLLY 3,411,374
PLASTIC VENT CONTROL
Filed May 3, 1967
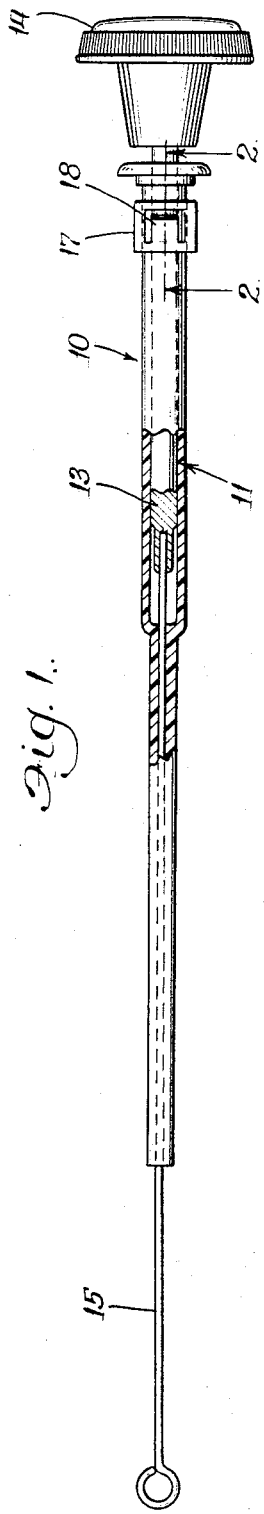
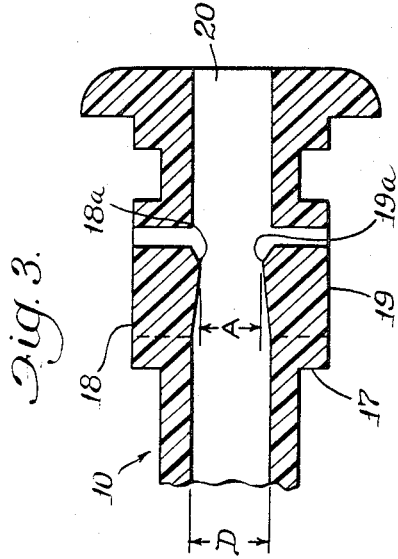
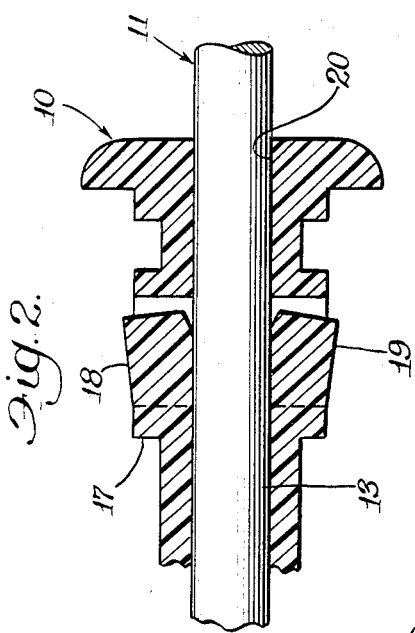
Inventor
Joseph A. Holly
By: Darbo, Robertson and Vandenburgh
Attys.

United States Patent Office 3,411,374
Patented Nov. 19, 1968

3,411,374
PLASTIC VENT CONTROL
Joseph A. Holly, Milwaukee, Wis., assignor to Springtrol, Inc., Milwaukee, Wis., a corporation of Wisconsin
Filed May 3, 1967, Ser. No. 635,760
3 Claims. (Cl. 74—502)

ABSTRACT OF THE DISCLOSURE

A push-pull control is provided which comprises a plastic casing having an actuating member axially movable in the casing. As an integral part of the casing two cantilever fingers are positioned axially of the casing and bear against the actuating member to provide a preload resisting displacement of the actuating member. This preload is achieved by reason of the fact that the fingers as molded extend into the path of the actuating member a distance in the range of about 0.010 inch to about 0.025 inch. Desirably the plastic is an acetal copolymer.

Background of the invention

Push-pull type controls, sometimes referred to as a Bowden wire control, are used for many purposes. In the illustrated embodiment the control is used for positioning the vents in an automobile. It is desirable that the control resist displacement to a limited extent so that once the vent is positioned it will hold that position, yet the automobile operator can simply and easily change the position of the vent by grasping a knob affixed to the actuating member and applying a force in excess of the resistance. It is highly desirable that the resistance be maintained under the various conditions of operation that will be encountered. It must be not get too small or the vent will not retain the set position. If it gets too large the operator is frustrated in his efforts to reposition the vent. Numerous factors such as wear, ambient temperature, etc., act to affect the amount of effort required to overcome the static resistance.

Numerous devices have been employed and/or proposed. These prior art devices all suffer from one or more of the following defects: they are expensive; they require the assemblage of a number of parts, thus increasing their cost; the static resistance is changed by wear within a relatively limited period of operation; the static resistance is significantly affected by temperature; the range of effort required to overcome the static resistance varies substantially from one unit to the next; the control does not move smoothly but has a raspy feel; etc.

The principal object of the present invention is to provide a control of this type that is inexpensive to manufacture, has a more than adequate service life, and otherwise ameliorates the difficulties encountered with prior art controls.

Description of the drawings

FIGURE 1 is an elevational view, partially broken away, of an embodiment of the present invention;
FIGURE 2 is a partial section as viewed at line 2—2 of FIGURE 1; and
FIGURE 3 is a section through the casing corresponding to FIGURE 2, but with the actuating member removed from the casing.

Description of the preferred embodiment

The drawings illustrate a control comprising a casing, generally 10, adapted to be mounted in a fixed position, and an actuating member, generally 11, within the casing. The actuating member includes a main rod 13, a handle 14, and a control wire 15.

The casing has an enlargement 17 within which are a pair of cantilever fingers 18 and 19. These fingers are molded as an integral part of the casing. As initially molded, and in their unstressed condition, they project into the passageway 20, which extends through the casing, as best illustrated in FIGURE 3. Thus distal portions 18a and 19a are a distance A apart, which distance is significantly less than the dimension D which is the diameter of passageway 20. The diameter of rod 13 is smaller than the diameter D only to the extent that the rod will move smoothly and easily in the portion having the diameter D. It has been found that to obtain the proper amount of preload, or resistance to initial movement, that the distal portion of each finger should extend into the passageway a distance that is within the range of about 0.010 inch to about 0.025 inch. Thus when the rod 13 is inserted, as illustrated in FIGURE 2, the distal ends of the fingers are displaced outwardly a distance substantially corresponding to the amount that they extend inwardly in FIGURE 3. While various plastics, such as polyethylene or polypropylene can be employed, the best results are obtained with an acetal copolymer, such as that sold under the trademark Delrin. Each casing 10 is molded as a unit. The pin employed to form the passageway 20 during the molding process has grooves formed in the surface thereof so that during the molding the distal protrusions 18a and 19a are formed.

I claim:
1. In a control of the push-pull type including a plastic casing within which is an actuating member movable axially in the casing, the improvement comprising: said casing having an integral portion defining a cantilever finger with a distal portion thereof in contact with said member, said portion when in contact with said member being displaced from the position the portion would assume if the member were not there to displace said portion from said position; whereby said portion is preloaded to apply to apply a built-in resistance to dispalcement of the manner in the casing.
2. In a control as set forth in claim 1, wherein said finger extends axially of the casing, and said plastic is an acetal copolymer.
3. In a control as set forth in claim 2, wherein there are two such fingers positioned at opposite sides of the member, said displacement of each of said fingers being in the range of about 0.010 inch to about 0.025 inch.

References Cited

FOREIGN PATENTS 1,294,854   4/1962   France.
978,315   12/1964   Great Britain.

FRED C. MATTERN, Jr., *Primary Examiner.*

LEONARD H. GERIN, *Assistant Examiner.*

UNITED STATES PATENT OFFICE
CERTIFICATE OF CORRECTION

Patent No. 3,411,374                                                    November 19, 1968

Joseph A. Holly

It is certified that error appears in the above identified patent and that said Letters Patent are hereby corrected as shown below:

Column 1, line 35, cancel "be". Column 2, line 45, cancel "to apply"; same line 45, "dispalcement" should read -- displacement --; lines 45 and 46, "manner" should read -- member --.

Signed and sealed this 10th day of March 1970.

(SEAL)
Attest:

Edward M. Fletcher, Jr.                                WILLIAM E. SCHUYLER, JR.

Attesting Officer                                                         Commissioner of Patents